Jan. 26, 1926.
M. WEIL
1,571,031
SPRING MOTOR INDICATOR
Original Filed Jan. 6, 1921
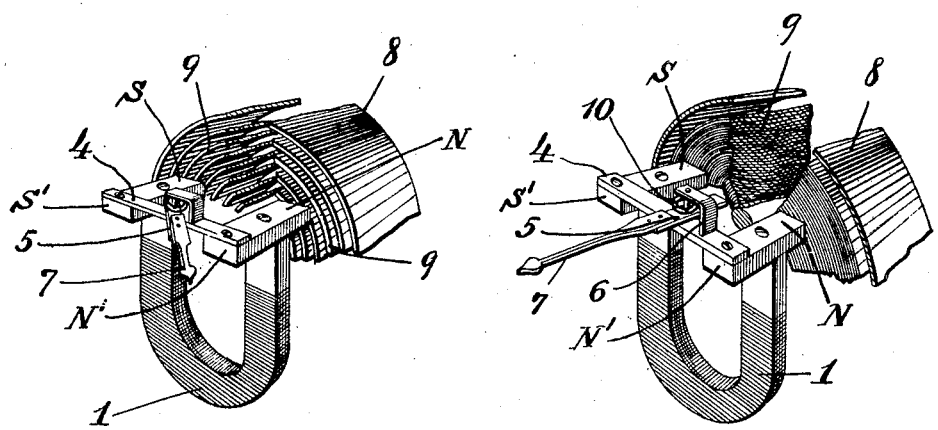
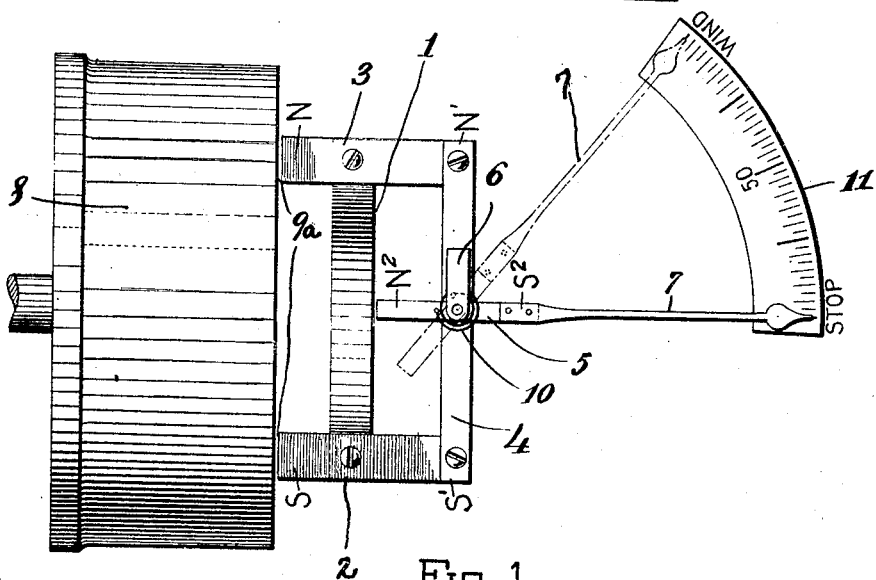
Inventor
Maximilian Weil Patented Jan. 26, 1926.

1,571,031

UNITED STATES PATENT OFFICE.

MAXIMILIAN WEIL, OF NEW YORK, N. Y.

SPRING-MOTOR INDICATOR.

Application filed January 6, 1921, Serial No. 435,541. Renewed April 8, 1925.

*To all whom it may concern:*

Be it known that I, MAXIMILIAN WEIL, a citizen of the United States, and resident of New York city, in the county of New York and State of New York, have invented certain new and useful Improvements in Spring-Motor Indicators, of which the following is a specification.

My invention relates to speed motor indicators, and particularly to devices responsive to the displacement of the spring of the motor, or other tension element, under varying conditions of use, whereby the state of the spring or equivalent will be indicated or ascertained.

In accordance with the principle of my invention, the displacement of a portion of the spring or other tension element is utilized to control the means for indicating the state of the spring or tension element. Applying the principle of my invention to the ordinary coiled spring, and utilizing the variation in reluctance effected by the displacement of the spring under wholly or partially wound conditions, a useful embodiment comprises a magnetic element having the path of its flux traversed by one or more portions of the spring and an indicator responsive to the variations of flux to indicate the extent to which the spring has been wound. Preferably, the magnetized element is positioned relatively to the coiled spring whereby the variation in reluctance is rendered a maximum for a given change in winding of the spring, and with this effect in view, the magnitized element may be in the form of a magnetic bridge having its free arms directed symmetrically with respect to an axis of the spring and thereby effect a flux passing transversely to the surfaces of portions of the coils of the spring. Thus, as the spring is wound, the proportion of the portion thereof toward the center of the spring is increased, and conversely as the spring is more and more unwound, the proportion of the portion of the spring toward the center of the spring is decreased. Under the first condition, i. e., nearly fully wound condition, the reluctance of the magnetic path is relatively small, whereas under the second condition, i. e., nearly unwound condition, the reluctance of the path is relatively high.

The indicating means may comprise a pointer controlled by a magnetized or polarized element responsive to the variations in reluctance.

My invention is applicable as an indicating device generally, and if desired, suitable recording means may be employed to make a record of the varying conditions of the displacement of the tension member on suitable recording material.

My invention is particularly advantageous in respect to spring motors of phonographs and other talking machines, wherein the actuating spring is usually encased in a fluid tight housing, since my invention does not require any change or modification in the construction or arrangement of the spring and its associated parts, except that the face of the housing on the side toward the magnetized element be made of non-magnetic material.

My invention is especially suitable for phonographs and talking machines, or the like, which are actuated by coils or other springs, to apprise the operator of the extent or degree of the winding or actuating condition of the spring, and thus preclude slowing down of the turn table while playing a record. My invention also obviates over-winding of the spring, attendant possibly with rupturing or snapping the spring.

Other features and objects of my invention will be more fully understood from the following description and the accompanying drawings, in which Fig. 1 is a top plan view of one form of my invention as applied to a spring motor;

Fig. 2 is a detail schematic view showing certain parts of the said modification under more fully wound condition of the spring; and Fig. 3 is a detail schematic view showing the same under less fully wound condition of the spring.

The present application is a substitute for my prior application, Serial No. 78,853, filed Feb. 17, 1916.

Referring to the drawings, the permanent magnet 1 is provided with the pole pieces 2, 3, shown as substantially parallel strips of magnetic material. The polarity of the ends of said pole pieces 2, 3, which are directed toward the motor spring, are indicated by N and S respectively north and south polarity, and similarly the polarity of the ends of said pole pieces 2, 3, which control the magnetically responsive element (to be more fully described hereinafter) are indicated by N' and S', respectively north and south polarities. Across the last two named ends of said pole pieces 2, 3, is arranged the support 4, of brass or other non-magnetic material, for the magnetically responsive element 5, shown as polarized with its north polarity at $N^2$ and its south porality at $S^2$. The element 5 is suitably pivoted on the support 4 and L-shaped arm 6, also of brass or other suitable non-magnetic material. The indicator 7 is suitably controlled by the magnetically responsive element 5, as by connecting said indicator 7 directly to the $S^2$ end of the same.

The housing 8 contains the coiled spring 9 as in approved forms of motor springs for phonographs, and the pole pieces 2, 3 are brought closely adjacent an end face of said housing 8, leaving a very small air gap $9^a$ between said face and the ends of said pole pieces 2, 3. Such end pieces of the housing 8 should be formed of non-magnetic material, or at least a portion of said end face in close proximity to said pole pieces should be of non-magnetic material. Means are provided for normally tending to move said magnetically responsive element 5 to a certain indication on the dial and in the drawing I have shown the spring 10 normally tending to move the indicator 7 toward the indication "Stop" on the dial 11. In this particular embodiment, the indicator 7 is pivotally mounted, and the dial 11 is radial in extent, and is shown bearing the indication "Stop" at one terminal and the indication "Wind" at the opposite terminal with scale markings extending from zero to a maximum of 100.

Thus, under tightly wound conditions of the spring 9, as indicated in Fig. 2, the reluctance of the path of the flux across the air gap $9^a$ will be relatively low, and accordingly the flux passing from the end N' of pole piece 3 to the end S' of the pole piece 2, will be relatively decreased, and accordingly the force of the flux of the path N', S' on the magnetically responsive element 5 will be reduced, whereby the spring 10 will move the indicator 7 to the full line position shown in Fig. 1. Under less tightly wound conditions of the spring, as indicated in Fig. 3, the reluctance of the path of the flux from the end N of pole piece 3 to the end S of pole piece 2, will be increased and the intensity of the flux from the end N' to the end S' will be increased, thereby causing the magnetically responsive element 5 to move toward the dot-and-dash line 7 shown on Fig. 1, which last named position 7 indicates the completely unwound condition of the spring 8. Intermediate unwound conditions of the spring will cause the indicator 7 to assume positions between its full line and its dot-and-dash position.

It will be clear that equivalent means may be substituted for the permanent magnet 1 to provide the relation set forth above, and that the pole pieces 2, 3, may be constructed and arranged with relation to the motor spring or other tension member and the magnetically responsive indicator or other element. By directing two ends of the pole pieces, 2, 3, in close proximity to the motor spring, the reluctance of the flux path passing through said ends is varied to a high degree, thereby effecting a corresponding high resultant movement of the magnetically responsive element.

It will also be noted that the indicator may be mounted other than pivotally to secure the desired indications, and that the indications on the scale may be chosen in accordance with the results to be attained, as by subdividing the range of the scale by the indications "1 record", "2 records", etc. or by indications based on the sizes or lengths of performance of the records.

It will be observed that the actuating tension member may be of various forms other than of a coil, and that it may be positioned in any desired plane with respect to the horizontal; also, that the scale or indicator may be positioned in any desired plane and the magnetized element arranged accordingly to secure the objects of the invention.

Whereas I have described my invention by reference to specific forms thereof, it is understood that many changes and modifications may be made without departing from my invention.

I claim:

1. An indicator for a spring, said indicator being provided with means for establishing a field of magnetic force extending within a portion of the spring and indicating means responsive to the variation of reluctance effected by the extent of displacement of the spring.

2. An indicator for a motor spring, the same being provided with a magnetic field extending within a portion of the motor spring and indicating means responsive to the variation of reluctance effected by the extent of displacement of the motor spring.

3. An indicator for a motor spring, the same being provided with a magnetic field extending within a portion of the motor spring and indicating means responsive to the variation of reluctance effected by the variation of the effective amount of the mass of the spring disposed in said magnetic field.

4. The combination with a tension spring, of means provided with a magnetic field extending within a portion of the said spring and responsive to the variation in reluctance effected by the extent of displacement of said tension member.

5. The combination with a tension spring, of means provided with a magnetic field extending within a portion of said spring and responsive to the variation in reluctance effected by variation in the effective amount of the mass of said spring disposed in said magnetic field.

6. The combination with a coiled tension spring, of indicating means provided with a magnetic field extending within a portion of said spring and responsive to the variation in reluctance effected by the extent of displacement of the coils of said coiled spring embraced in said magnetic field.

7. The combination of a motor spring and a device provided with a magnetic field extending within a portion of said spring and responsive to the variation in reluctance effected by the extent of coiling and uncoiling of said motor spring.

8. The combination of a coiled motor spring and a device provided with a magnetic field extending within a portion of said spring and responsive to the variations in reluctance effected by the extent of coiling and uncoiling of said motor spring.

9. The combination with a motor spring, of an indicating device provided with a magnetic field passing through a portion of the spring of said motor and comprising an indicating element responsive to the displacement of said spring.

10. The combination with a spring motor, of an indicating device provided with a magnetic field passing through a portion of the spring of said motor and comprising an element responsive to the variation in reluctance effected by the extent of displacement of said spring.

11. The combination with a motor having a coiled spring, of an indicating device provided with a magnetic field passing through a portion of said coiled spring and comprising an element responsive to the variation in reluctance effected by the variation in the number of coils of said coiled spring disposed in the effective region of the magnetic field.

12. The combination of a motor spring, means for establishing a magnetic field intercepting at least a portion of said spring and means responsive to the variation in reluctance effected by the displacement of said spring within the magnetic field.

13. The combination with a spring motor, of an indicating device provided with a magnetic field passing through a portion of the spring of said motor and comprising a magnetically responsive element disposed in magnetic relation to the spring of said motor.

14. The combination with a coiled motor spring, of means for establishing a magnetic field transversely intercepting at least a portion of a coil of said spring and an element responsive to the variation in reluctance effected by the displacement of said coil portion within the magnetic field.

15. The combination with a coiled spring, of a means establishing multiple magnetic fields, one of which intercepts a portion of said spring and means responsive to the variations in reluctance effected by the displacement of said spring portion within said one magnetic field.

16. The combination with a displaceable member comprising magnetic material, of a magnetized element having multiple flux parts, one of said flux paths traversing a portion of said member to thereby vary the reluctance of said path, and a resiliently controlled element responsive to the changes in reluctance of said one path.

17. The combination with a spring having one end secured to a central winding shaft, of a magnetized element having two portions substantially symmetrically related to said shaft and indicating means controlled by the variation of flux effected by displacement of said spring.

18. The combination with a motor spring, of means comprising two magnetized portions disposed adjacent said spring and means responsive to the variation in reluctance effected by the extent of displacement of a portion of said spring within the magnetic field established by said magnetized portions.

19. The combination with a motor spring, of magnetized means having a pole disposed toward and adjacent a portion of said motor spring and means including a polarized element responsive to variation in reluctance effected by the extent of displacement of said spring portion within the magnetic field.

20. The combination with a displaceable laminated member comprising magnetic material, of means provided with a magnetic field traversing one or more laminæ of said member and responsive to the variation in reluctance effected by the variation in distance between said laminæ.

21. The combination with a displaceable laminated member comprising magnetic material and means provided with a magnetic field traversing one or more laminæ of said member and responsive to the variation in reluctance due to density of magnetic material embraced in the magnetic field.

22. The combination with a motor spring, of a magnetic element provided with a magnetic field extending to a portion of said motor spring, said magnetic element being responsive to change in reluctance effected upon displacement of said spring and resilient means acting in opposition to the magnetic forces imposed upon said element.

23. The combination with a motor spring, of a device responsive to variations in reluctance and comprising a magnetized element having two portions directed towards said motor spring, a polarized element magnetically related to two other portions of said magnetized element, an indicator controlled by said polarized element, a scale for said indicator and a spring normally tending to move said indicator to a certain indication on said scale.

24. The combination with a motor spring, of a device responsive to variations in reluctance and comprising a magnetized element having two portions directed towards said motor spring, a polarized element magnetically related to two other portions of said magnetized element, a pivoted indicator controlled by said polarized element, a radial scale for said indicator, and a spring normally tending to move said indicator to a certain indication on said scale.

25. The combination of displaceable magnetic plates, means provided with a magnetic field extending within a portion of certain of said plates and responsive to variations in reluctance effected by the extent of displacement of said certain plates in said magnetic field.

26. The combination of displaceable magnetic plates, means provided with a magnetic field passing through said magnetic plates and responsive to variations in reluctance effected by the extent of displacement of one or more of said plates in said magnetic field.

27. The combination with a motor mechanism comprising a member displaceable in response to work done and containing magnetic material, of means for creating a magnetic field about said member and an indicating device responsive to the variation in reluctance due to the displacement of said member.

28. The combination of means for creating a magnetic field, motor mechanism comprising a member displaceable in response to work done and capable of varying the reluctance of said magnetic field and indicating means responsive to the variation in reluctance due to the displacement of said member.

29. The combination with relatively movable parts of magnetic material, of means provided with a magnetic field extending to certain of said parts and means responsive to variations in reluctance in said field resulting from movement of said certain parts.

30. The combination with relatively movable parts of magnetic material, of means for creating a magnetic field extending to certain of said parts and magnetic means responsive to variations in reluctance in said field resulting from relative movement of said certain parts.

Signed at New York city in the county of New York and State of New York this 1st day of January A. D. 1921.

MAXIMILIAN WEIL.